(12) United States Patent
Osawa et al.

(10) Patent No.: US 7,454,124 B2
(45) Date of Patent: *Nov. 18, 2008

(54) VIDEO REPRODUCING APPARATUS AND REPRODUCING METHOD

(75) Inventors: Yoshihito Osawa, Tokyo (JP); Hiroshi Katayama, Tokyo (JP)

(73) Assignee: Sony Corporation (JP)

( * ) Notice: Subject to any disclaimer, the term of this patent is extended or adjusted under 35 U.S.C. 154(b) by 254 days.

This patent is subject to a terminal disclaimer.

(21) Appl. No.: 11/075,600

(22) Filed: Mar. 9, 2005

(65) Prior Publication Data

US 2005/0152687 A1    Jul. 14, 2005

Related U.S. Application Data

(63) Continuation of application No. 09/338,154, filed on Jun. 23, 1999, now Pat. No. 6,898,371.

(30) Foreign Application Priority Data

Jun. 26, 1998    (JP) ................ P10-180926

(51) Int. Cl.
  *H04N 5/91* (2006.01)
(52) U.S. Cl. ............... 386/112; 386/124; 386/131
(58) Field of Classification Search .............. None
  See application file for complete search history.

(56) References Cited

U.S. PATENT DOCUMENTS

| | | | |
|---|---|---|---|
| 4,065,787 A | 12/1977 | Owen et al. | |
| 4,109,276 A | 8/1978 | Hopkins et al. | |
| 4,605,962 A | 8/1986 | Christopher et al. | |
| 4,611,225 A | 9/1986 | Powers | |
| 4,673,980 A | 6/1987 | Murakami et al. | |
| 4,688,081 A | 8/1987 | Furuhata et al. | |

(Continued)

FOREIGN PATENT DOCUMENTS

EP     0688134     12/1995

(Continued)

OTHER PUBLICATIONS

Abstract of KR 98007645, LG Electronics Co Ltd, Mar. 30, 1998.

*Primary Examiner*—Huy T Nguyen
(74) *Attorney, Agent, or Firm*—Lerner, David, Littenberg, Krumholz & Mentlik, LLP

(57) ABSTRACT

For a plurality of digital video signals whose frame frequencies are different, a pixel number converting circuit to convert the number of pixels is provided so that differences of the frame frequencies are replaced to differences of the numbers of pixels and a plurality of digital video signals whose frame frequencies are different can be processed by a common clock frequency. The frame frequency is detected by a frame frequency value decoder and the number of pixels in the horizontal direction of the pixel number converting circuit is properly set in accordance with the frame frequency. As mentioned above, if the differences of the frame frequencies are replaced to the differences of the numbers of pixels and the images are converted into the image in which the frame frequencies are the same and the numbers of pixels are different, the frame frequencies are equalized and the signals can be processed by the same clock.

9 Claims, 3 Drawing Sheets

U.S. PATENT DOCUMENTS

| | | |
|---|---|---|
| 5,070,395 A | 12/1991 | Kitaura et al. |
| 5,223,931 A | 6/1993 | Fernsler et al. |
| 5,278,706 A | 1/1994 | Iketani et al. |
| 5,329,367 A | 7/1994 | Fernsler et al. |
| 5,583,575 A | 12/1996 | Arita et al. |
| 5,790,096 A | 8/1998 | Hill, Jr. |
| 5,805,233 A | 9/1998 | West |
| 5,812,210 A | 9/1998 | Arai et al. |
| 5,887,114 A | 3/1999 | Nakatani et al. |
| 5,929,924 A | 7/1999 | Chen |
| 5,933,196 A | 8/1999 | Hatano et al. |
| 5,978,041 A | 11/1999 | Masuda et al. |
| 5,999,570 A | 12/1999 | Chaki |
| 6,020,927 A | 2/2000 | Tanaka et al. |
| 6,028,641 A | 2/2000 | Kim |
| 6,097,437 A | 8/2000 | Hwang |
| 6,118,486 A | 9/2000 | Reitmeier |
| 6,229,571 B1 | 5/2001 | Sato |
| 6,311,328 B1 | 10/2001 | Miyazaki et al. |
| 6,313,813 B1 | 11/2001 | Narui et al. |
| 6,380,979 B1 | 4/2002 | Tokoi et al. |
| 6,392,711 B1 | 5/2002 | Kesatoshi |
| 6,441,858 B1 | 8/2002 | Nakamoto et al. |
| 6,549,198 B1 | 4/2003 | Uto et al. |
| 6,549,577 B2 | 4/2003 | Florencio et al. |
| 6,633,288 B2 | 10/2003 | Agarwal et al. |
| 6,674,478 B2 | 1/2004 | Milyazaki et al. |
| 2002/0054238 A1 | 5/2002 | Kunio |

FOREIGN PATENT DOCUMENTS

| | | |
|---|---|---|
| GB | 2319139 | 5/1998 |

VIDEO REPRODUCING APPARATUS AND REPRODUCING METHOD

CROSS-REFERENCE TO RELATED APPLICATIONS

This application is a continuation of U.S. patent application Ser. No. 09/338,154 filed Jun. 23, 1999, which claims the benefit of the filing date of Japanese Application No. JP10-180926, filed Jun. 26, 1998, the disclosures of which are hereby incorporated herein by reference.

FIELD OF THE INVENTION

The invention especially relates to a video reproducing apparatus and a reproducing method for receiving and reproducing image data encoded by MPEG (Moving Picture Experts Group) 2 like a digital television broadcasting. More particularly, the invention relates to such video reproducing apparatus and method which can cope with a plurality of video signals whose frame frequencies are slightly different.

DESCRIPTION OF THE RELATED ART

A satellite digital television broadcasting for broadcasting a digital video signal by using a satellite has been started. The development of a ground wave digital television broadcasting for broadcasting a digital video signal by using a ground wave is also being progressed. In the digital television broadcasting, it is expected to perform various services such as high definition television broadcasting, multichannel broadcasting, multimedia broadcasting, and the like.

In the digital television broadcasting, for example, MPEG2 is used as an image compression system. According to the MPEG2 system, a video signal is compression encoded by a motion compensation predictive coding and a DCT (Discrete Cosine Transform). In the MPEG2 system, three kinds of picture planes called an I (Intra) picture, a P (Predicti) picture, and a B (Bidirectionally Predictive) picture are sent. In the I picture, a DCT encoding is performed by using pixels of the same frame. In the P picture, a DCT encoding using a motion compensation prediction is performed with reference to the I picture or P picture which has already been encoded. In the B picture, a DCT encoding using a motion prediction is performed with reference to the I pictures or P pictures before and after the target B picture.

A decoding circuit of MPEG2 is provided for a digital television receiver to receive a digital television broadcasting which is transmitted by using the MPEG2 system. The decoding circuit of MPEG2 can be constructed as shown in, for example, FIG. 1.

In FIG. 1, a bit stream of MPEG2 is supplied to an input terminal 101. The bit stream is once stored in a buffer memory 102.

An output of the buffer memory 102 is supplied to a variable length decoding circuit 103. A decoding is performed in the variable length decoding circuit 103 on a macroblock unit basis. Coefficient data of DCT and a motion vector are outputted from the variable length decoding circuit 103. Further, various control data indicative of a frame frequency of a video signal and data such as predictive mode, quantization scale, and the like are outputted from the variable length decoding circuit 103.

DCT coefficient data consisting of (8×8) pixels is supplied to an inverse quantizing circuit 104. A quantization scale of the inverse quantizing circuit 104 is set in accordance with quantization scale information from the variable length decoding circuit 103. Motion vector information and predictive mode information are supplied to a motion compensating circuit 107.

The DCT coefficient data is inversely quantized by the inverse quantizing circuit 104. An output of the inverse quantizing circuit 104 is supplied to an IDCT circuit 105. An output of the IDCT circuit 105 is supplied to an adding circuit 106. An output of the motion compensating circuit 107 is supplied to the adding circuit 106.

In the I picture, since the DCT encoding is performed by using pixels of the same frame, in case of the I picture, image data of a picture plane of one frame is derived from the IDCT circuit 105. The image data is outputted from an output terminal 111 via the adding circuit 106 and a buffer memory 110. The image data in this instance is stored as data of a reference picture plane into an image memory 108.

In the P picture, a DCT encoding using a motion compensation prediction is performed by referring to the I picture or P picture. Therefore, differential data between the relevant picture and the reference picture plane is outputted from the IDCT circuit 105. The data of the reference picture plane is stored in the image memory 108. A motion vector is supplied from the variable length decoding circuit 103 to the motion compensating circuit 107. In case of decoding the P picture, an image of a reference frame from the image memory 108 is motion compensated by the motion compensating circuit 107 and supplied to the adding circuit 106. In the adding circuit 106, the data of the motion compensated reference image and the differential data from the IDCT circuit 105 are added. Thus, data of the picture plane of one frame is derived. The image data is outputted from the output terminal 111 through the buffer memory 110. The image data in this instance is stored into the image memory 108 as data of the reference picture plane.

In the B picture, a DCT encoding using the motion prediction is performed by referring to the I pictures or P pictures before and after the target B picture. Therefore, differences between the target picture and the reference picture planes before and after it are outputted from the IDCT circuit 105. The data of the reference picture planes before and after the target picture is stored in the image memory 108. In case of decoding the B picture, the images of the reference frames before and after a target frame from the image memory 108 are motion compensated by the motion compensating circuit 107 and supplied to the adding circuit 106. In the adding circuit 106, the data of the motion compensated reference images before and after the target image and the differential data from the IDCT circuit 105 are added. Thus, the data of the picture plane of one frame is derived. The image data is outputted from the output terminal 111 via the buffer memory 110.

As mentioned above, the digital video signal of the MPEG2 system is decoded by the variable length decode circuit 103, inverse quantizing circuit 104, and IDCT circuit 105 and is outputted from the output terminal 111 via the buffer memory 110.

In the digital television broadcasting of the MPEG2 system, there is a possibility such that signals of a plurality of standards whose frame frequencies are slightly different are sent. Hitherto, therefore, it is necessary to prepare two clock generating circuits 121 and 122 for the buffer memory 110 and to switch the two clock generating circuits 121 and 122 in accordance with the frame frequency of the received television broadcasting.

That is, in a system mainly used as a standard to digitize the existing NTSC system, there is a standard in which the number of horizontal pixels of the video signal is set to 858 pixels, the number of scanning lines in one frame is set to 525 lines, and a clock frequency is set to 13.5 MHz. In this case, the frame frequency is obtained by 13.5 MHz/(858×525)

and its value is equal to 29.97 Hz.

On the other hand, as a standard of a digital NTSC system which will be newly standardized in future, there is a standard such that a horizontal frequency of the video signal is set to 858 pixels, the number of scanning lines in one frame is set to 525 lines, and a clock frequency is set to 13.5 MHz. According to this standard, the frame frequency is equal to just 30 Hz.

As mentioned above, in the digital television broadcasting of the MPEG2 system, there are the standard having the frame frequency of 29.97 Hz and the standard having the frame frequency of 30 Hz. Therefore, while the digital television broadcasting having the frame frequency of 29.97 Hz is being received, it is necessary to control the reading operation from the buffer memory 110 so as to set the frame frequency to 29.97 Hz. While the digital television broadcasting having the frame frequency of 30 Hz is being received, it is necessary to control the reading operation from the buffer memory 110 so as to set the frame frequency to 30 Hz.

For this purpose, hitherto, two clock generating circuits 121 and 122 are provided and the two clock generating circuits 121 and 122 are switched in accordance with the frame frequency of the received video signal.

That is, in FIG. 1, an output of the clock generating circuit 121 is supplied to a terminal 123A of a switching circuit 123. An output of the clock generating circuit 122 is supplied to a terminal 123B of the switching circuit 123. The clock generating circuit 121 generates a clock to the buffer memory 110 so that the video data is read out at a frame frequency 29.97 Hz. The clock generating circuit 122 generates a clock to the buffer memory 110 so that the video data is read out at a frame frequency 30 Hz. The clock generating circuits 121 and 122 generate the clocks on the basis of a system clock from a system clock generating circuit 120. An output of the switching circuit 123 is supplied to the buffer circuit 110.

Various control data showing the frame frequencies of the video signals are included in the output of the variable length decoding circuit 103. The control data is supplied to a frame frequency decoder 124. In the frame frequency decoder 124, the frame frequency of the received video signal is discriminated and a switch change-over signal is generated from the frame frequency decoder 124 in accordance with the frame frequency.

When the received video signal has the frame frequency of 29.97 Hz, the switching circuit 123 is set to the terminal 123A side. Therefore, the video data is read out from the buffer memory 110 at the frame frequency of 29.97 Hz.

When the received video signal has the frame frequency of 30 Hz, the switching circuit 123 is set to the terminal 123B side. Therefore, the video data is read out from the buffer memory 110 at the frame frequency 30 Hz.

As mentioned above, in the digital television broadcasting, since there is a possibility such that a plurality of video signals whose frame frequencies are slightly different are transmitted, hitherto, it is necessary to prepare a plurality of clock generating circuits 121 and 122 corresponding to the frame frequencies.

Although it is also considered to, for example, generate clocks of two frame frequencies from one oscillating circuit, as mentioned above, the necessary frame frequencies are very close frequencies such as 29.97 Hz and 30 Hz. A ratio of those two frequencies is equal to (1000/1001). It is very difficult to stably generate the clocks corresponding to two frequencies from one oscillating circuit.

As mentioned above, if a plurality of clock generating circuits are prepared in accordance with the frame frequencies of the video signals which are received, a problem that a circuit scale increases and the costs rise occurs. When the digital television receiver is realized as an integrated circuit, particularly, it is difficult to mount the clock generating circuit including the oscillating circuit onto the same chip as that of the decoding circuit. Therefore, if a plurality of clock generating circuits are provided, the circuit scale is increased and the costs are raised.

SUMMARY OF THE INVENTION

It is, therefore, an object of the invention to provide a video reproducing apparatus and a reproducing method which can output an image by the same clock for a plurality of video signals whose frame frequencies are slightly different.

According to the invention, there is provided a video reproducing apparatus for reproducing a plurality of digital video signals having different frame frequencies, comprising:

frame frequency discriminating means for discriminating a frame frequency of an inputted digital video signal; and pixel number converting means for replacing differences among the frame frequencies by differences among the numbers of horizontal pixels for the plurality of digital video signals having the different frame frequencies and performing a conversion of the number of pixels so that the plurality of digital video signals having the different frame frequencies can be processed by a common clock frequency, wherein the number of horizontal pixels of the pixel number converting means is properly set in accordance with an output of said frame frequency discriminating means.

According to the invention, there is provided a video reproducing method of reproducing a plurality of digital video signals having different frame frequencies, comprising the steps of:

discriminating the frame frequency of said digital video signal;

replacing differences among the frame frequencies by differences among the numbers of horizontal pixels for the plurality of digital video signals having the different frame frequencies and performing a conversion of the number of pixels so that the plurality of digital video signals having the different frame frequencies can be processed by a common clock frequency; and properly setting the number of horizontal pixels after completion of the conversion of the number of pixels in accordance with the discriminated frame frequency.

As standards of digitizing the video signal of the existing NTSC system, there are the standard in which the frame frequency is equal to 29.97 Hz and the standard in which the frame frequency is equal to 30 Hz. The numbers of component pixels of two kinds of images are the same number of pixels, there are 858 pixels in the horizontal direction and there are 525 lines in the vertical direction. As mentioned above, as for the two kinds of images in which the numbers of pixels are equal and the frame frequencies are different, by replacing the difference of the frame frequencies to the difference of the numbers of pixels and by converting those images into images in which the frame frequencies are equal and the numbers of pixels are different, the same frame frequency is obtained and the signals can be processed by the same clock. Since the images can be outputted by the same clock for a plurality of video signals whose frame frequencies are slightly different, a plurality of clock generating circuits are unnecessary and the reduction of the circuit scale and the decrease in costs can be realized.

The above, and other, objects, features and advantage of the present invention will become readily apparent from the following detailed description thereof which is to be read in connection with the accompanying drawings.

DETAILED DESCRIPTION OF THE PREFERRED EMBODIMENTS

Figure 1:
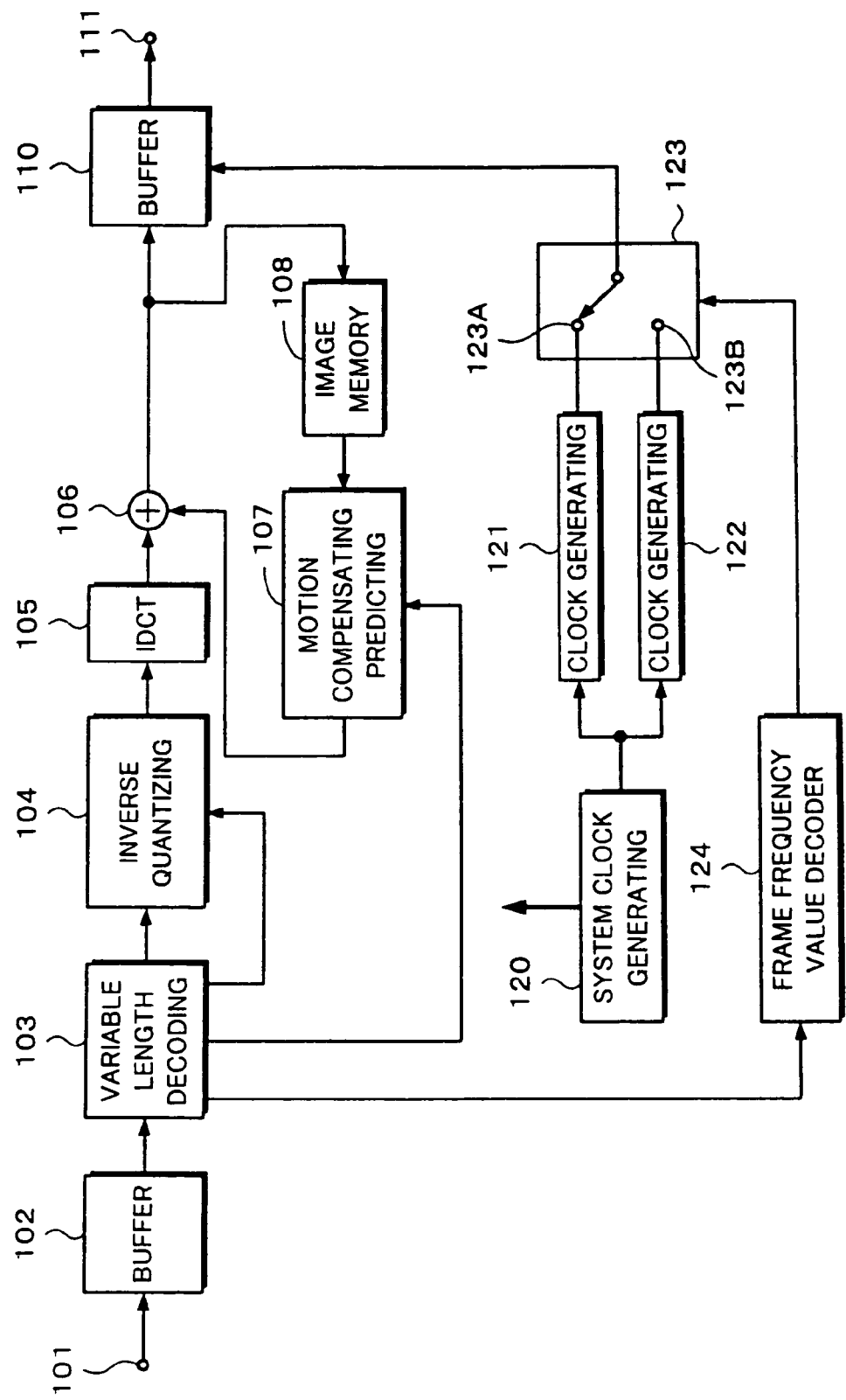
FIG. 1 is a block diagram of an example of a conventional encoder circuit.
Figure 2:
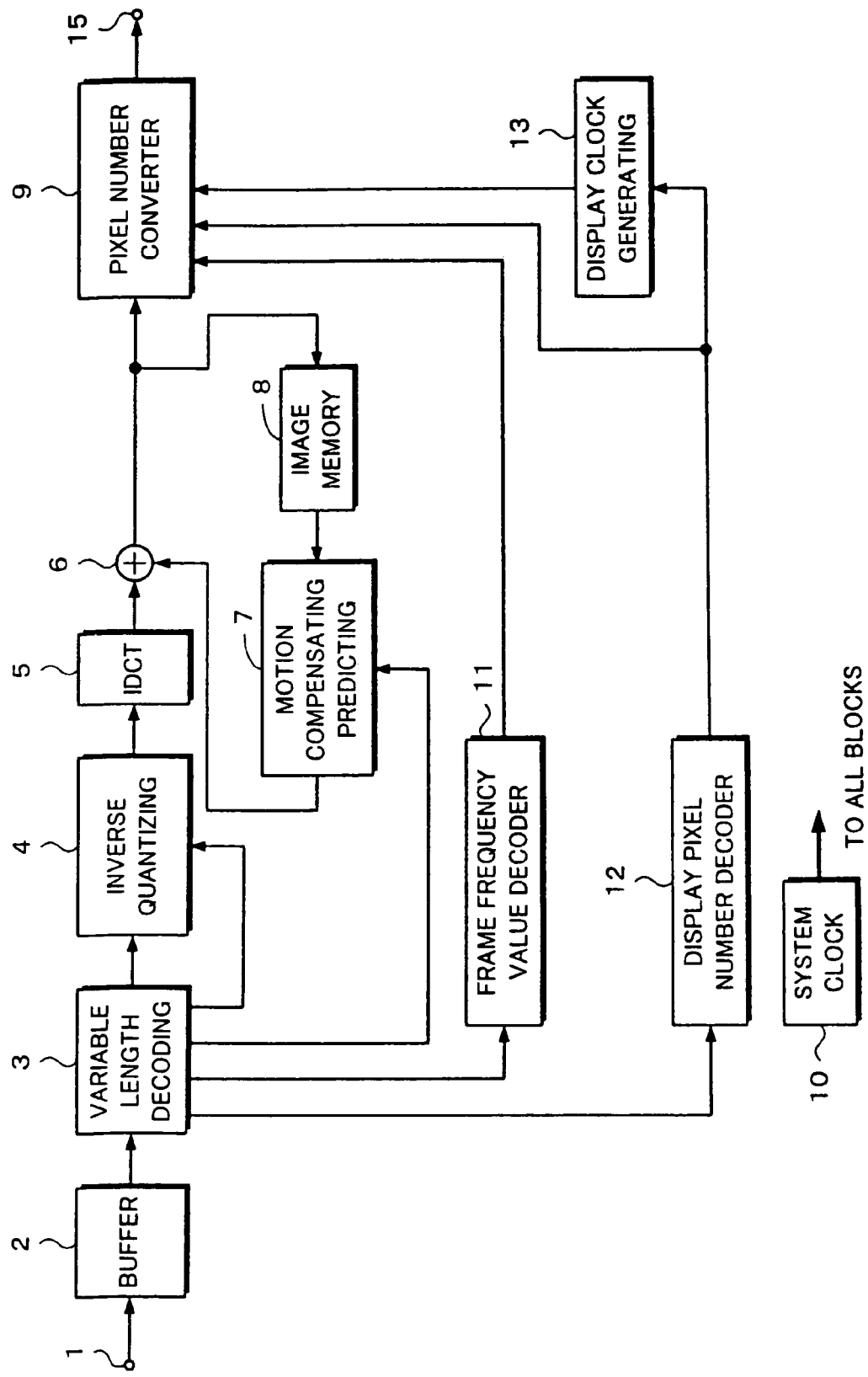
FIG. 2 is a block diagram of an example of an encoder circuit to which the invention is applied.

An embodiment of the invention will now be described hereinbelow with reference to the drawings. FIG. 2 shows an example of a decoding circuit of MPEG2 to which the invention is applied. In FIG. 2, a bit stream of MPEG2 is supplied to an input terminal 1. This bit stream is once stored in a buffer memory 2.

In the MPEG2 system, three kinds of picture planes called an I picture, a P picture, and a B picture are sent. In the I picture, a DCT encoding is performed by using the pixels of the same frame. In the P picture, a DCT encoding using a motion compensation prediction is performed with reference to the I picture or P picture which has already been encoded. In the B picture, a DCT encoding using a motion prediction is performed with reference to the I pictures or P pictures before and after the target picture.

An output of the buffer memory 2 is supplied to a variable length decoding circuit 3. In the variable length decoding circuit 3, encoded information of a macroblock is decoded.

Coefficient data of DCT and data such as motion vector, predictive mode, quantization scale, and the like are outputted from the variable length decoding circuit 3. Various control data showing frame frequencies of video signals is outputted from the variable length decoding circuit 3.

The DCT coefficient data of (8×8) pixels from the variable length decoding circuit 3 is supplied to an inverse quantizing circuit 4. A quantization scale of the inverse quantizing circuit 4 is set in accordance with quantization scale information from the variable length decoding circuit 3. Motion vector information and predictive mode information are supplied to a motion compensating circuit 7.

The data of the frame frequency from the variable length decoding circuit 3 is detected by a frame frequency value decoder 11. The frame frequency information is supplied to a pixel number converting circuit 9. Display pixel number information from the variable length decoding circuit 3 is detected by a display pixel number decoder 12. The display pixel number data is supplied to a display clock generating circuit 13. The clock generating circuit 13 generates a clock on the basis of a system clock from a system clock generating circuit 10.

The DCT coefficient data is inversely quantized by the inverse quantizing circuit 4. An output of the inverse quantizing circuit 4 is supplied to an IDCT circuit 5. An output of the IDCT circuit 5 is supplied to an adding circuit 6. An output of the motion compensating circuit 7 is supplied to the adding circuit 6.

In the I picture, a DCT encoding is performed by using the pixels of the same frame. In case of the I picture, data of the picture plane of one frame is derived from the IDCT circuit 5. The image data is supplied to the pixel number converting circuit 9 via the adding circuit 6. The image data in this instance is stored into an image memory 8 as data of a reference picture plane.

In the P picture, a DCT encoding using a motion compensation prediction is performed with reference to the I picture or P picture. Therefore, differential data between the target picture and the reference picture plane is outputted from the IDCT circuit 5. The data of the reference picture plane has been stored in the image memory 8. A motion vector is supplied from the variable length decoding circuit 3 to the motion compensating circuit 7.

In case of decoding the P picture, an image of a reference frame from the image memory 8 is motion compensated by the motion compensating circuit 7 and is supplied to the adding circuit 6. The data of the motion compensated reference image and the differential data from the IDCT circuit 5 are added by the adding circuit 6. Thus, the data of the picture plane of one frame is obtained. The image data is supplied to the pixel number converting circuit 9. The image data at this time is stored into the image memory 8 as data of the reference picture plane.

In the B picture, a DCT encoding using a motion prediction is performed with reference to the I pictures or P pictures before and after the target picture. Therefore, the differential data between the target picture and the reference picture planes before and after the target picture plane is outputted from the IDCT circuit 5. The data of the reference picture planes before and after the target picture plane has been stored in the image memory 8.

In case of decoding the B picture, the images of the reference frames before and after the target frame from the image memory 8 are motion compensated by the motion compensating circuit 7 and supplied to the adding circuit 6. In the adding circuit 6, the data of the motion compensated reference images before and after the target image and the differential data from the IDCT circuit 5 are added. Thus, data of the picture plane of one frame is derived. The image data is supplied to the pixel number converting circuit 9.

The pixel number converting circuit 9 replaces the differences of the frame frequencies to the differences of the numbers of horizontal pixels, thereby enabling the video signals of a plurality of images in which the numbers of pixels are common and the frame frequencies are different to be handled by the same clock. Frame frequency value information from the frame frequency value decoder 11, the display pixel number information from the display pixel decoder 12, and the display clock from the display clock generating circuit 13 are supplied to the pixel number converting circuit 9. The display clock generating circuit 13 generates the clock in accordance with the display pixel number data from the display pixel number decoder 12. The system clock generating circuit 10 supplies the clock to each section.

The digital video signal obtained by decoding the digital video data of MPEG2 is outputted from the pixel number converting circuit 9. The digital video signal is outputted from an output terminal 15.

As mentioned above, in the MPEG2 decoder to which the invention is applied, in the pixel number converting circuit 9, the video signals of a plurality of images in which the numbers of pixels are common and the frame frequencies are different can be handled by the same clock by replacing the differences of the frame frequencies to the differences of the numbers of horizontal pixels. This process will now be described further in detail.

As standards (hereinafter, referred to as SD) to digitize the video signal of the existing NTSC system, there are the standard whose frame frequency is equal to 29.97 Hz and the standard whose frame frequency is equal to 30 Hz. The numbers of pixels constructing these two kinds of images are the same number of pixels, there are 858 pixels in the horizontal direction, and there are 525 lines in the vertical direction.

As mentioned above, if the two kinds of images in which the numbers of pixels are the same and the frame frequencies are different are converted into the images in which the frame frequencies are the same and the numbers of pixels are different by replacing the difference between the frame frequencies to the difference between the numbers of pixels, those images can be processed by the same clock.

That is, a ratio of the two kinds of frame frequencies is equal to (1000/1001). Therefore, if it is intended to perform the operation to convert the number of pixels of the image whose frame frequency is equal to 29.97 Hz to an integer times of 1001 pixels and to convert the number of pixels of the image whose frame frequency is equal to 30 Hz to an integer times of 1000 pixels, those images can be processed by the same clock.

For example, when the frame frequency is equal to 29.97 Hz, by converting the number of pixels from 858 pixels to 1001 pixels, the clock frequency is equal to 30×(1000/1001) Hz×1001 pixels×525 lines=15.7 MHz As for the operation clock frequency when the frame frequency is equal to 30 Hz, by converting the number of pixels from 858 pixels to 1000 pixels, the clock frequency is equal to 30 Hz×1000 pixels×525 lines=15.75 MHz As mentioned above, if the number of pixels of the image whose frame frequency is equal to 29.97 Hz is converted to 1001 pixels and the number of pixels of the image whose frame frequency is equal to 30 Hz is converted to 1000 pixels, those images can be processed by the same clock frequency (15.75 MHZ).

When the frame frequency is equal to, for example, 29.97 Hz, by converting the number of pixels into 4004 pixels, the clock frequency is equal to 30 Hz×(1000/1001) Hz×4004 pixels×525 lines=63 MHz When the frame frequency is equal to 30 Hz, by converting the number of pixels into 4000 pixels, the clock frequency is equal to 30×4000 pixels×525 lines=63 MHz As mentioned above, by converting the number of pixels of the image whose frame frequency is equal to 29.97 Hz into 4004 (=1001×4) pixels and by converting the number of pixels of the image whose frame frequency is equal to 30 Hz into 4000 (=1000×4) pixels, the images can be processed by the same clock frequency (15.75 MHz).

Although the above example has been described with respect to the SD image, even in case of a high definition television system (hereinafter, referred to as HD) image, it can be also similarly processed.

In case of the HD, there are an image whose frame frequency is equal to 29.97 Hz and an image whose frame frequency is equal to 30 Hz. The numbers of pixels constructing the two kinds of images are equal to the same number of pixels, there are 2200 pixels in the horizontal direction, and there are 1125 scanning lines in the vertical direction.

A ratio of the two kinds of frame frequencies is equal to (1000/1001). Therefore, if the operation to convert the number of pixels in case of the frame frequency of 29.97 Hz to an integer times of 1001 pixels and to convert the number of pixels in case of the frame frequency of 30 Hz to an integer times of 1000 pixels is performed, those images can be processed by the same clock.

For example, when the frame frequency is equal to 29.97 Hz, by converting the number of pixels to 2002 pixels, the clock frequency is equal to 30×(1000/1001) Hz×2002 pixels×1125 lines=67.5 MHz When the frame frequency is equal to 30 Hz, by converting the number of pixels to 2000 pixels, the clock frequency is equal to 30 Hz×2000 pixels×1125 lines=67.5 MHz As mentioned above, if the number of pixels of the image whose frame frequency is equal to 29.97 Hz is converted to 2002 pixels and the number of pixels of the image whose frame frequency is equal to 30 Hz is converted to 2000 pixels, those images can be processed by the same clock frequency (67.5 MHz).

As mentioned above, in the SD, for example, when the frame frequency is equal to 29.97 Hz, the number of pixels is converted into 4004 pixels, and when the frame frequency is equal to 30 Hz, the number of pixels is converted into 4000 pixels, so that the images can be processed by the common clock frequency of 63 MHz. In the HD, for example, when the frame frequency is equal to 29.97 Hz, if the number of pixels is converted into 2002 pixels and, when the frame frequency is equal to 30 Hz, if the number of pixels is converted into 2000 pixels, the images can be processed by the common clock frequency of 67.5 MHz. In this case, 63 MHz as a clock frequency to process the SD and 67.5 MHz as a clock frequency to process the HD are close. As mentioned above, if the clock frequency when the SD is processed and the clock frequency when the HD is processed are close, it is convenient when executing processes at the post stage.

That is, the digital video signal decoded as shown in FIG. 2 is finally converted into the analog video signal and is outputted. Therefore, an A/D converter and a low pass filter are arranged at the post stage of the output terminal 15. When the clock frequencies are close, characteristics of the low pass filter in this instance can be similarly set in both cases of the SD and HD.

Figure 3:
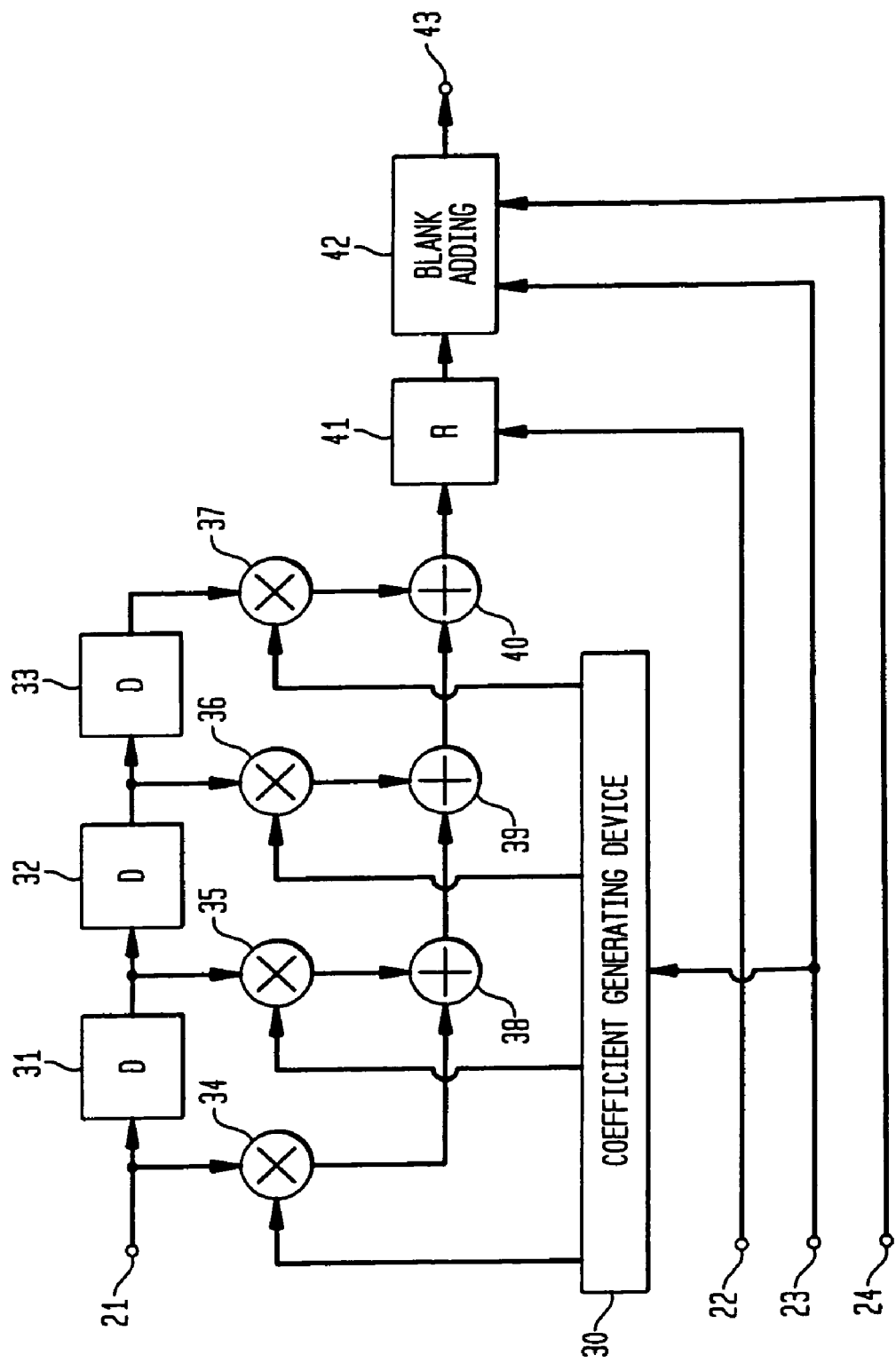
FIG. 3 is a block diagram of an example of a pixel number converting circuit in the encoder circuit to which the invention is applied.

FIG. 3 shows an example of a construction of the pixel number converting circuit 9. In FIG. 3, the decoded digital video signal is supplied to an input terminal 21. A clock of, for example, 63 MHz or 67.5 MHz is supplied to a clock input terminal 22. Information indicative of, for example, either the SD or the HD is supplied to an information input terminal 23. Information showing whether the frame frequency is equal to 29.97 Hz or 30 Hz is supplied to an information input terminal 24.

The digital video signal from the input terminal 21 is supplied to a cascade connection of delay circuits 31, 32, and 33. Outputs at the stages between the input terminal 21 and the delay circuits 31, 32, and 33 are supplied to multiplying circuits 34, 35, 36, and 37, respectively. Outputs of the multiplying circuits 34 and 35 are supplied to an adding circuit 38. An output of the multiplying circuit 36 and an output of the adding circuit 38 are supplied to an adding circuit 39. An output of the adding circuit 39 and an output of the multiplying circuit 37 are supplied to an adding circuit 40. Coefficients according to the number of display pixels are generated from a coefficient generating circuit 30 to the multiplying circuits 34 to 37. The delay circuits 31 to 33, multiplying circuits 34 to 37, and adding circuits 38 to 40 construct a digital filter.

An output of the adding circuit 40 is supplied to a register 41. A clock common to a plurality of video signals having different frame frequencies, for example, a clock of a frequency 63 MHz or 67.5 MHz is supplied from the terminal 22 to the register 41. In the register 41, the clock of the digital video signal transmitted through the digital filter comprising the delay circuits 31 to 33, multiplying circuits 34 to 37, and adding circuits 38 to 40 is transferred to the clock from the input terminal 22.

An output of the register 41 is supplied to a blank adding circuit 42. The value of the number of pixels from the display pixel input terminal 23 and the value of the frame frequency from the frame frequency value input terminal 24 are supplied to the blank adding circuit 42. The blank adding circuit 42 adds blank data to the digital video signal so that the number of pixels in the horizontal direction is set to an integer times of 1001 in case of the frame frequency of 29.97 Hz and the number of pixels in the horizontal direction is set to an integer times of 1000 in case of the frame frequency of 30 Hz.

By the blank adding circuit 42, for example, in the SD, the blank data is added in a manner such that the number of pixels is equal to 4004 pixels in case of the frame frequency of 29.97 Hz and the number of pixels is equal to 4000 pixels in case of the frame frequency of 30 Hz. In the HD format, for example, the blank data is added in a manner such that the number of pixels is equal to 2002 pixels in case of the frame frequency of 29.97 Hz and the number of pixels is equal to 2000 pixels in case of the frame frequency of 30 Hz.

As mentioned above, the number of horizontal pixels is properly changed in accordance with the frame frequency and the video signal of a constant clock is outputted from the pixel number converting circuit 9. Thus, even when the frame frequencies are equal to 29.97 Hz and 30 Hz and they are different from each other, the video signals can be processed by the clock of the same clock frequency.

According to the invention, for example, as for a plurality of images in which the numbers of pixels are the same and the frame frequencies are different, the differences of the frame frequencies are replaced to the differences of the numbers of pixels. Thus, the signals can be processed by the same clock. As mentioned above, since the image can be outputted by the same clock for a plurality of video signals whose frame frequencies are slightly different, a plurality of clock generating circuits are unnecessary and the reduction of the circuit scale and the costs can be realized.

Having described a specific preferred embodiment of the present invention with reference to the accompanying drawings, it is to be understood that the invention is not limited to that precise embodiment, and that various changes and modifications may be effected therein by one skilled in the art without departing from the scope or the spirit of the invention as defined in the appended claims.

What is claimed is:

1. A video reproducing apparatus for reproducing a plurality of digital compressed video streams having different frame frequencies, comprising:

a decoder for receiving the plurality of digital compressed video streams and for decoding frame frequency value information and display pixel number information contained in the digital compressed video streams, the frame frequency value information including frame frequencies and the display pixel number information including numbers of horizontal pixels;

a clock for generating a timing signal having a clock frequency based on the display pixel number information; and a converter for producing digital video signals associated with the plurality of digital compressed video streams by replacing differences among the decoded frame frequencies with differences among the numbers of horizontal pixels so that the digital video signals can be processed using the same clock frequency, wherein said converter sets the numbers of horizontal pixels based on the display pixel number information and the frame frequency information.

2. The apparatus according to claim 1, wherein the converter comprises a register coupled between a digital filter and a blank adding circuit such that the blank adding circuit adds blank data to the compressed video streams.

3. The apparatus according to claim 2, wherein the digital filter comprises a plurality of delay circuits, plurality of multiplying circuits and plurality of adding circuits arranged to filter a clock signal associated with the compressed video streams.

4. The apparatus according to claim 3, further comprising a coefficient generating circuit for generating display pixel coefficients that are fed to the plurality of multiplying circuits.

5. The apparatus according to claim 1, wherein the compressed video streams are compressed in accordance with the MPEG-2 format.

6. An apparatus according to claim 1, wherein said converter converts the number of horizontal pixels so that a ratio of the numbers of horizontal pixels of the plurality of digital compressed video streams is set to a reciprocal of a ratio of the frame frequencies of the plurality of compressed digital video streams.

7. An apparatus according to claim 1, wherein said decoder decodes the frame frequency by extracting frame frequency discrimination information included in a digital television signal.

8. An apparatus according to claim 1, wherein said converter sets different numbers of horizontal pixels in a case where the digital compressed video stream is a standard video stream and a case where the digital compressed video stream is a I high definition video stream, respectively.

9. An apparatus according to claim 8, wherein the number of horizontal pixels which is set by said converter for the standard video stream and the number of horizontal pixels which is set by said converter for the high definition video stream are selected at the time of designing the video reproducing apparatus so that a clock frequency for processing the standard video stream and a clock frequency for processing the high definition video stream are set to substantially the same.

* * * * *